S. M. MILLER.
Grinding Mill.
No. 59,435.  Patented Nov. 6, 1866.
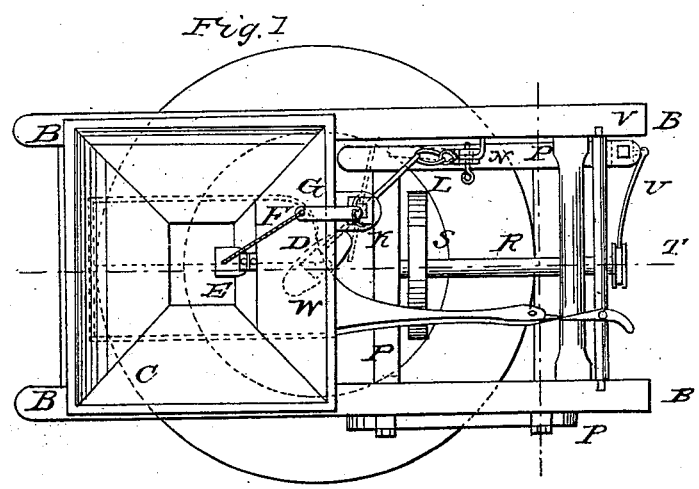
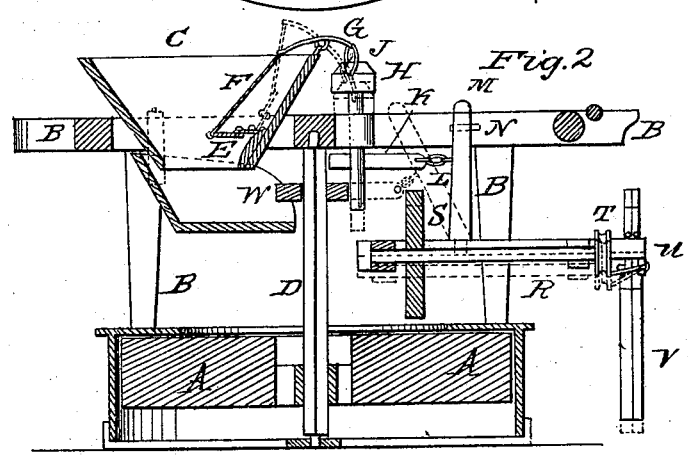
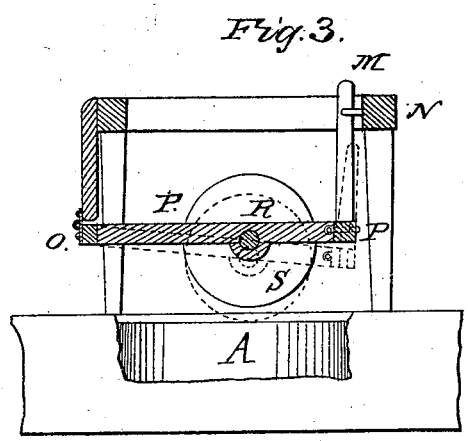

UNITED STATES PATENT OFFICE.

SAMUEL M. MILLER, OF BEAVER MILL, PENNSYLVANIA.

IMPROVEMENT IN GRINDING-MILLS.

Specification forming part of Letters Patent No. 59,435, dated November 6, 1866.

*To all whom it may concern:*

Be it known that I, SAMUEL M. MILLER, of Beaver Mill, Strasburg township, Lancaster county, and State of Pennsylvania, have invented a new and useful Improvement in Flouring-Mills, or Engines to Check their Operation; and I hereby declare that the following is an exact description thereof, reference being had to the accompanying drawings, and to the letters of reference marked thereon, making a part of this specification, in which—

Figure 1 is a top view of the invention; Fig. 2, a sectional view; Fig. 3, a sectional view of self-adjusting movable frame and friction-roller.

The nature of my invention consists in the devices arranged on the hopper and connected with a movable and self-adjusting frame that drops with a friction-roller, so that the friction-roller falls upon the mill-burrs and stops their revolution. At the same time a pulley and cord draws the lever that throws the mill machinery out of gear, disconnecting the gearing operated by the water-wheel, and stopping the mill, so as to prevent the mill-burrs from becoming heated and setting fire to the mill, which so frequently occurs when the hopper has become emptied of the grain and the burrs deprived of their proper supply of grain. By this invention the milling-burrs are stopped when the grain is discharged from the hopper; and the same devices can be attached to each set of burrs, so that one will not interfere with any other burrs that may be operating in the mill; or, if steam is used, my invention will open the valves, let the steam escape, and stop the machinery. I can also attach a wire or cord to the movable frame, so as to ring a bell, and also give instant alarm.

A represents the mill-burrs; B, the frame that supports the hopper C; D, the spindle. E is a hinged wing in the hopper, upon which the grain rests when the hopper is full. At the end of the wing a cord, F, is attached, and suspended to a short pivoted beam, G, attached to the side of hopper C. At the opposite end of beam G a weight, H, is attached by a chain or cord, J. The lower end of weight H has an arm or cross-piece, K, to the one end of which is a cord, L, attached also to an upright lever, M, that is suspended on a hook, N. This lever supports a self-adjusting square frame, P, that operates up and down on hinges Q. This square frame P supports a shaft or axle, R, that revolves a friction-roller, S, and a pulley, T. A cord, U, connects pulley T with an upright lever, V, that is commonly used to gear and ungear the mill gearing or shafting from the main water or driving wheel, as, by moving the lever V to either side, the cog-wheels of shafting are geared or ungeared to start or stop the mill.

When the mill is running, and the hopper filled with grain, the grain bears upon the hinged wing E, that keeps the aforesaid devices set in their proper places until the supply of grain in the hopper has diminished to the height of the wing E, when the wing is relieved of the weight of the grain, when it is drawn upward by the falling of the weight H, that brings its arm K in contact with the wing W on the spindle, that draws the lever M from its hook N, which allows the frame P to fall and press the friction-wheel S heavily upon the burr A, that stops the revolution of the burrs, while the revolution of the friction-wheel S turns the axle R and pulley T, that winds the cord U around the pulley suddenly, and sufficiently to draw the upright lever V to one side, so as to unshift the shafting or gearing from the action of the water-wheel and stop the mill, thus securing the safety of the mill from injury by fire from the friction of the burrs, that so frequently occurs.

What I claim as my invention, and desire to secure by Letters Patent, is—

The devices of the hinged wing E, as attached to the hopper C and weight H, so as to operate the lever M, in combination with the square frame P, friction-roller S, pulley T, and lever V, or any equivalent devices, when arranged and operating as herein described, and for the purposes set forth.

S. M. MILLER.

Witnesses:
J. FRANKLIN REIGART,
JOHN M. AMWEG.